Aug. 14, 1962 W. R. DORSEY ET AL 3,049,426
METHOD FOR MAKING DEHYDRATED APPLES
Filed June 17, 1960
FIG_1
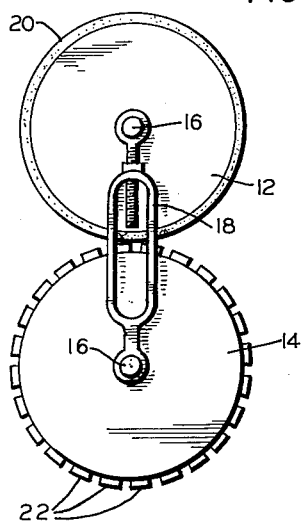
FIG_2
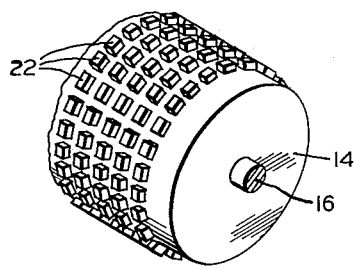
FIG_3
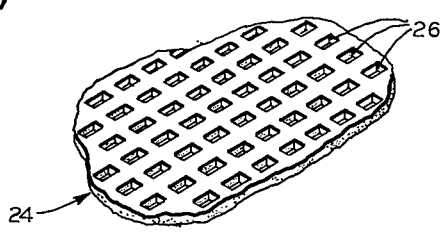
FIG_4
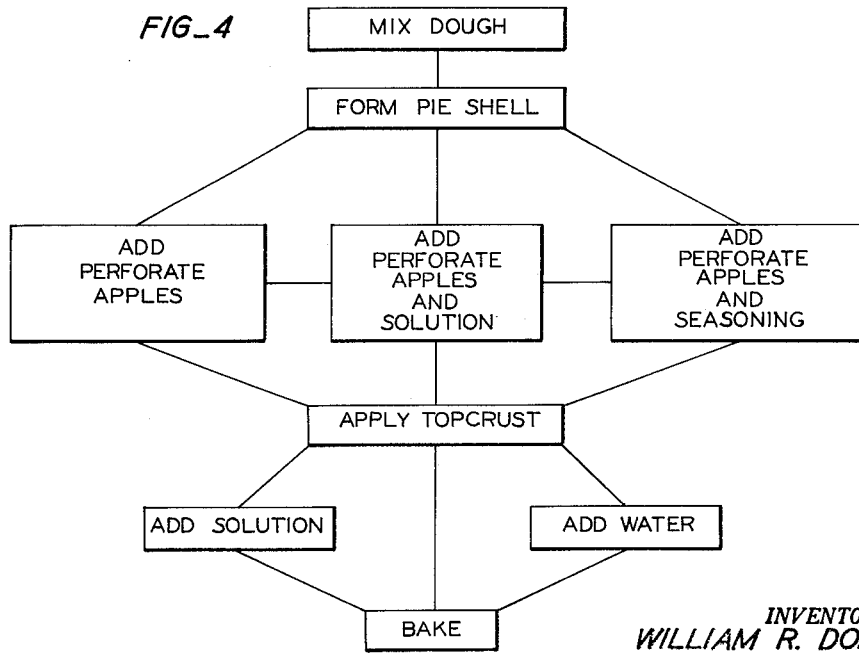
INVENTORS
WILLIAM R. DORSEY
SUMNER I. STRASHUN
BY
ATTORNEY 3,049,426
METHOD FOR MAKING DEHYDRATED APPLES
William R. Dorsey, Orinda, and Sumner I. Strashun, El Cerrito, Calif., assignors to Vacu-Dry Company, Oakland, Calif., a corporation of California
Filed June 17, 1960, Ser. No. 36,887
3 Claims. (Cl. 99—92)

The present invention relates to a novel method for preparing dehydrated apple segments, to the end product, and to a particular application of the segments wherein they are incorporated in a pie and rehydrate while being baked without the necessity of preliminary rehydration.

A number of methods of dehydrating apples are known to the art. A satisfactory method may be described as peeling, coring and segmenting apples which are then treated with a suitable anti-discoloration agent. The treated segmented apples are next subjected to a current of heated air to remove a major portion of the moisture from the apple segments leaving a residual moisture content by weight, ranging from about 16% to 30%. The apples are then further dried to an ultimate moisture content comprsing less than 5% by weight of the apples.

A major problem with regard to dehydrated apple segments resides in rehydrating them. The rate of rehydration varies according to the variety of apple used, but regardless of the variety, a substantial period of soaking has always been necessary.

In accordance with the present invention, the segmented apples are initially dried to remove a major portion of the water from them and then are subjected to a perforating action to define a plurality of perforations extending through individual segments and wherein the cellular structure of ridges spacing the perforations is retained normally open and uncrushed. Further dehydration of the segments to an ultimate moisture content of less than 5% for purposes of preservation prior to end use is facilitated by the perforations, and upon rehydration the perforations enable the segments to readily receive water which materially shortens the time necessary for rehydration.

One object of the present invention resides in perforating the apples with a plurality of perforations to shorten the time required for dehydration to an ultimate moisture content.

Another object resides in the fact that the perforate dehydrated apple segments rehydrate much more readily than apple segments which have not been perforated. Heretofore, it has been necessary to preliminarily soak the dehydrated apple segments for an extended period prior to end use. The dehydrated product of the present invention however shortens the time of rehydration sufficiently that the apple segments will ordinarily completely rehydrate in the normal cooking required to form the ultimately eaten product.

Thus, in making pies from dehydrated apple segments it has heretofore been necessary to rehydrate the dried apples before baking the pie. Dehydrated apple segments perforated in accordance with the present invention may be placed in a pie shell, an aqueous solution which may include sugar and selected seasonings is poured over the segments in sufficient quantity to immerse them, and the pie is ready to be baked. The perforate apple segments of the present invention thoroughly rehydrate during baking to form a palatable pie. The necessity of preliminary rehydration of the apple segments is thereby eliminated with a consequent saving in time and money.

The invention lends admirably to commercial production and distribution of pies. The pie may be rapidly assembled and baked, or may be distributed in an unbaked condition, properly packaged, whereby the ultimate user merely adds an aqueous solution to the pie and bakes it himself, in either case, without the bother of preliminarily reconstituting the apples.

The foregoing and other objects will be appreciated upon reading and understanding the following written description, setting forth a preferred practice of the invention.

In the drawings:

FIG. 1 is an end view schematically illustrating apparatus for perforating the apple segments;

FIG. 2 is a fragmentary perspective of one of the rollers of FIG. 1 and showing the perforators;

FIG. 3 is a perspective of a dehydrated apple segment perforated in accordance with the present invention; and FIG. 4 is a flow sheet illustrating the steps in forming a pie employing the product of FIG. 3.

The apples are initially cored, peeled and segmented as by being sliced into relatively thin pieces, and are subjected to a spray or bath containing an anti-discoloration preparation. The apples are next dehydrated until a major portion of the moisture is removed. At this stage the apples are perforated which step comprises a novel feature of the present invention.

FIGS. 1 and 2 illustrate apparatus suitable for perforating the apple segments. FIG. 1 illustrates a pair of rollers 12 and 14 carried on spindles 16 adjustably spaced as by turnbuckle 18. Roller 12 is coated with a smooth resilient covering 20. Roller 14 is formed with a plurality of perforators or studs 22. The rollers are caused to operate in counter directions by means not illustrated, and the partially dried apple segments are passed through the rollers to perforate the segments. The perforate segments are now ready to be dehydrated to an ultimate low moisture content.

Spacing between the rollers should be adjusted as by turnbuckle 18 such that studs 22 at least tangentially contact and preferably slightly impinge upon resilient covering 20. The preferred spacing in conjunction with the resilient surface of roller 12 affords complete penetration of the studs through the segments defining a plurality of spaced holes or perforations in the end product. Over a period of operation surface 20 will be abraded by the studs and the formed perforations will not extend entirely through the segments but rather will define waffle-like depressions on one surface of the segments. Spacing between the rollers should then be readjusted to cause the studs to again impinge upon surface 20. Apple segments are perforate in accordance with the present invention, however, whether individual perforations extend entirely or slightly less than entirely through the segments.

The length of perforators 22 is preferably slightly greater than the thickness of apple segments being dehydrated such that crushing of the ridges spacing the perforations is avoided, and the generally open, water emitting and receiving cellular structure of the ridges is retained as well as the structural integrity of individual segments preventing undue fracturing.

A suitable perforate dehydrated apple segment has been obtained by initially slicing the apples into segments measuring about one-quarter inch in thickness, sulphuring the apple segments with sodium bisulphite and then dehydrating the sulphured segments to a moisture content by weight of from about 16% to 30%. The perforating apparatus comprised a pair of steel rollers 12 and 14. Roller 12 was provided with a smooth rubber covering 20. Roller 14 was formed with a plurality of perforators or studs 22. Studs 22 were spaced at intervals of about 0.1 inch, projected radially from roller 14 five-sixteenths inch, and defined a blunt end, oblong in plan measuring one-eighth by one-sixteenth inch. Rollers 12 and 14 were spaced slightly less than five-sixteenth inch apart such that studs 22 impinged about 0.1 inch upon surface 20 of roller 12. The partially dehydrated apples were then passed through the oppositely rotating rollers forming partially dehydrated, perforate apple segments. The perforate segments were then further dehydrated to a moisture content of less than 5%.

The perforating operation facilitated ultimate dehydration since the overall drying surface of the individual segments was increased, and provided an end product of a thin apple segment having a plurality of small perforations extending through the segment and wherein the structural integrity of individual segments was preserved with the cells of ridges spacing the perforations retained uncrushed and normally open.

FIG. 3 illustrates a dehydrated apple segment 24 having a plurality of perforations 26 in accordance with the present invention.

The perforate dried segments were further found to rehydrate much faster than dehydrated apples previously known and in fact thoroughly rehydrate in baking a pie without the necessity of any preliminary soaking, whereas dehydrated apples heretofore known have required rehydration prior to baking. For example, a superficially similar dehydrated product made in accordance with U.S. Patent No. 2,901,359, entitled Dried Apple and Process for Preparing, issued August 25, 1959 to J. H. Forkner, required preliminary soaking and rehydration before incorporation of the apple segment into a pie shell preparatory to baking.

FIG. 4 is a flow sheet describing a preferred method for forming a pie of the perforate apple segments.

A pie shell is formed of pie dough with raised marginal edges to define a filling receiving area. The filling includes the perforate dehydrated apple slices which are inserted in the defined area. Sugar, selected seasonings and other dry ingredients may be inserted at this stage with the dehydrated apple slices. If an upper crust is desired a lid is formed in a conventional manner of the pie dough and placed upon the raised marginal edges of the shell. Where an upper crust is to be included it should be formed with a central opening. This permits an aqueous solution to be poured into the defined area and also provides a vent permitting escape of gases formed during the baking. The aqueous solution which completes the filling is then poured into the shell to immerse the dehydrated apple segments. If sugar, seasoning and other dry ingredients have been inserted in the shell with the dehydrated apples, water alone is poured into the shell. Alternatively, the sugar and seasoning may be combined with the water to form an aqueous solution and added to the pie shell simultaneously with insertion of the apples, or the solution may be poured in after applying the top crust. Since the sugar and seasonings to be used are well known and a matter of individual taste, "aqueous solution" as used in the claims, refers to water which may or may not include sugar, selected seasonings and other ingredients as desired. The pie is now ready to be baked in a conventional manner.

A satisfactory pie has been made from a recipe including the following ingredients:

| | Grams |
|---|---|
| Dehydrated apple slices perforated in accordance with the present invention | 92 |
| Sugar | 92 |
| National Starch Co. Instant clear gel #37 | 7 |
| Salt | 1.3 |
| Cinnamon, ground | .45 |
| Citric acid | 1.00 |
| Lemon flavor, Fritzsche Bros. Aromalok (R) Lemojuce No. 30376 | .015 |

The dry ingredients are placed in a 9 inch pie tin, known generally as a 309 pie tin, which is lined with a shell of pie dough. If desired a top crust formed with a center hole is placed on the shell and two cups of tap water are poured slowly through the hole. Alternatively the dry ingredients and water may be pre-mixed or the dehydrated apples may be placed separately in the shell, the other ingredients being mixed with the water and then poured into the shell over the dehydrated apples. The pie is then baked 40 to 45 minutes at 425° F.

Since the perforate apple segments reconstitute during baking and without preliminary soaking it will be apparent that the above enumerated steps may be performed at different points in space and time. This feature permits distribution to the consuming public of pies at different stages of production as the tastes of the consuming public may dictate. Thus the pie may be subjected to all the above steps by the baker for distribution of a ready to eat pie. Alternatively the pie shell may be commercially distributed in unbaked form and containing the dehydrated apple segments and all other dry ingredients, or the dry ingredients may be separately packaged to facilitate handling. The consumer then simply pours the solution (water or water mixed with the separately packaged ingredients) into the shell, bakes it, and enjoys the added pleasure of a freshly baked pie.

An unobvious and beneficial result not heretofore noted is that seed hulls and hard portions of the apple segment are removed from the product by the perforating operation. In coring and slicing the apples a residue of the seed hulls is ordinarily retained by some of the slices. The hulls are hard and detract from palatability. The perforating operation of the present invention breaks the hull residue from the slices whereby the separated residue is subsequently removed with the fines.

Although the invention has been described with some particularity for purposes of clarity it will be appreciated that certain modifications may be made without departing from the spirit of the invention as limited only by the appended claims.

What is claimed is:

1. A dehydrated apple segment formed with a plurality of spaced perforations and wherein the cells in ridges of said segment spacing said perforations are retained normally open and uncrushed, said segment being prepared by a dehydration process reducing the moisture content thereof to about 16% to 30% by weight of said segment, followed by a puncturing process to define said plurality of spaced perforations and being further prepared by a second dehydration process subsequent to the puncturing process to reduce the segment moisture content to less than 5% by weight.

2. A method of forming dehydrated apple segments comprising dehydrating said segments to a first moisture content from about 16% to 30% by weight of said segments, puncturing said dehydrated segments to define a plurality of spaced perforations in said segments while avoiding crushing portions of said segments intermediate said perforations, and then further dehydrating said segments to a second moisture content of less than 5% by weight.

3. A method of making pies from dehydrated, perforated apple segments, said segments being prepared by a dehydration process reducing the moisture content thereof to about 16% to 30% by weight of said segment, followed by a puncturing process to define a plurality of spaced perforations in said segments while avoiding crushing portions of said segments intermediate said perforations, and being further prepared by a second dehydration process subsequent to the puncturing process to reduce the moisture content of said segments to less than 5% by weight, the invention which comprises, forming a shell of pie dough defining raised marginal edges; placing the perforate, dehydrated segments in said shell, forming a top crust with a hole, and placing said top crust in intimate contact with the marginal edges of said shell; entering an aqueous solution through the hole in said upper crust to immerse the perforate segments; and then subjecting the formed pie to heat to bake said shell and crust and rehydrate said perforate segments.

References Cited in the file of this patent

UNITED STATES PATENTS

| | | |
|---|---|---|
| 678,514 | Regnier | July 16, 1901 |
| 1,062,969 | Harrison | May 27, 1913 |
| 1,261,412 | Lewites | Apr. 2, 1918 |
| 2,686,540 | Stahmer | Aug. 17, 1954 |
| 2,756,152 | Strause | July 24, 1956 |